US008720329B2

(12) United States Patent
Kelderman

(10) Patent No.: US 8,720,329 B2
(45) Date of Patent: May 13, 2014

(54) DUST REMOVAL ATTACHMENT FOR A BALER AND METHOD FOR USING SAME

(76) Inventor: Gary L. Kelderman, Oskaloosa, IA (US)

( * ) Notice: Subject to any disclaimer, the term of this patent is extended or adjusted under 35 U.S.C. 154(b) by 322 days.

(21) Appl. No.: 13/365,441

(22) Filed: Feb. 3, 2012

(65) Prior Publication Data

US 2013/0203474 A1  Aug. 8, 2013

(51) Int. Cl.
*A01F 12/54* (2006.01)

(52) U.S. Cl.
USPC .............. 100/35; 100/7; 100/188 R; 56/341; 460/117; 460/149

(58) Field of Classification Search
CPC ..................................................... A01F 15/10
USPC ........ 100/2, 3, 7, 35, 88, 188 R; 56/341, 343; 460/117, 149
See application file for complete search history.

(56) References Cited

U.S. PATENT DOCUMENTS

| | | | | |
|---|---|---|---|---|
| 3,020,829 | A * | 2/1962 | Pearson | 100/102 |
| 4,352,267 | A * | 10/1982 | Mellinger | 56/341 |
| 4,805,391 | A * | 2/1989 | De Zylva | 56/343 |
| 4,951,452 | A * | 8/1990 | Lundahl et al. | 56/341 |
| 5,758,479 | A * | 6/1998 | Staheli | 56/16.4 R |
| 7,318,376 | B1 * | 1/2008 | Baldauf et al. | 100/33 R |
| 7,743,699 | B1 | 6/2010 | Freeman | |
| 8,028,620 | B2 | 10/2011 | Freeman | |

OTHER PUBLICATIONS 62-pages—Operators Manual—Freeman 200 & 330 Automatic Pull-type Balers 270 & 370 Balers, by J.A. Freeman & Son, Inc., Portland, OR.
40-pages—Operator's Manual—Freeman—Model 1390 Automatic Hay Baler, by J.A. Freeman & Son, Inc.
8-pages, entitled—Results From the Chariton Valley Biomass Project Switchgrass Co-Fire Testing, by Wade A. Amos, National Renewable Energy Laboratory, Golden, CO.
4-pages, entitled—Choosing Hay for Horses, by Laurie M. Lawrence and Robert J. Coleman, Department of Animal Sciences; Jimmy C. Henning, Department of Agronomy—Cooperative Extension Service, University of Kentucky, College of Agriculture.
4-pages—brochure entitled Freeman—Model 280, 285/380, 385 Pull Type Baler, by J.A. Freeman & Son, Inc., Portland, OR.

* cited by examiner

*Primary Examiner* — Jimmy T Nguyen
(74) *Attorney, Agent, or Firm* — Sturm & Fix LLP

(57) ABSTRACT

A method and apparatus for removing dust and dirt before baling uses a baler having a baling chamber, a pickup for picking up material to be baled from the ground and an inlet section between the pickup and the baling chamber. The inlet section has a perforated member at the bottom thereof, the perforated member forming a part of an air chamber. A blower attached to the air chamber is used for pulling air from the inlet section, through the perforated member and from the air chamber whereby dirt will be extracted from the inlet section before such dirt enters the baling chamber.

3 Claims, 5 Drawing Sheets

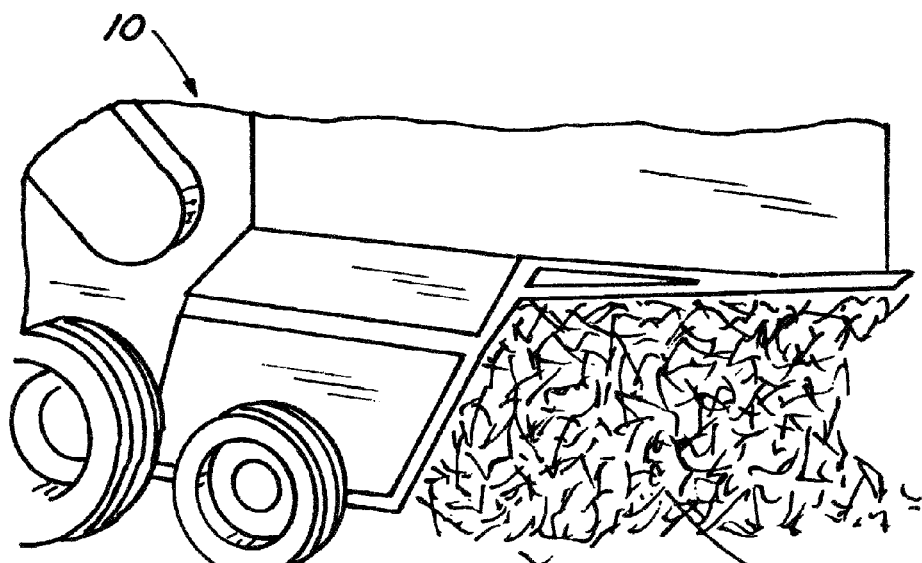
Fig. 1
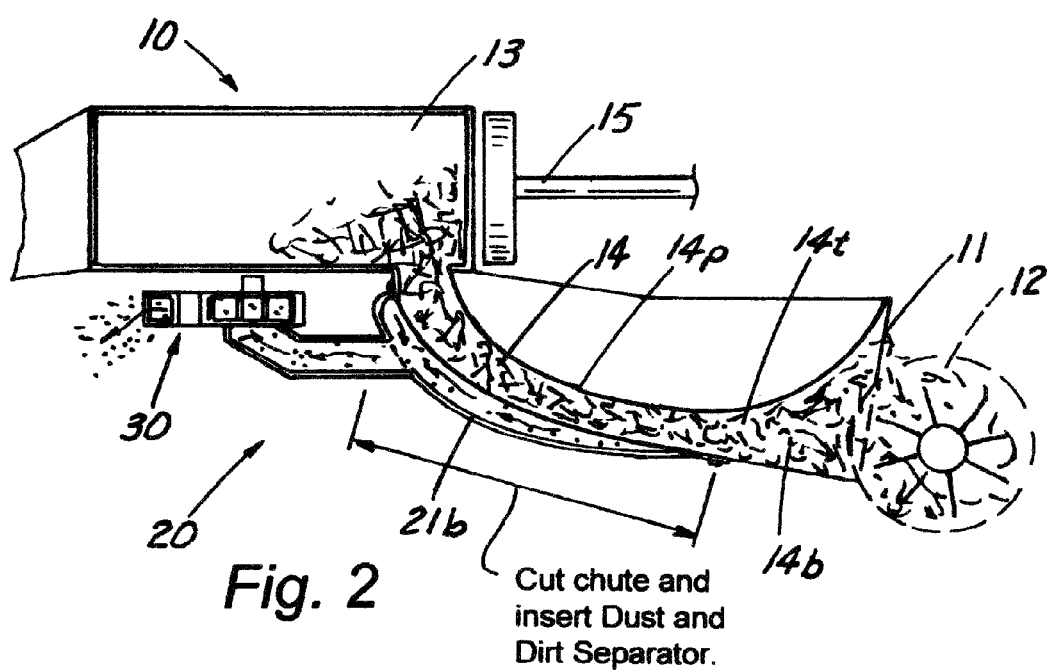
Fig. 2 — Cut chute and insert Dust and Dirt Separator.

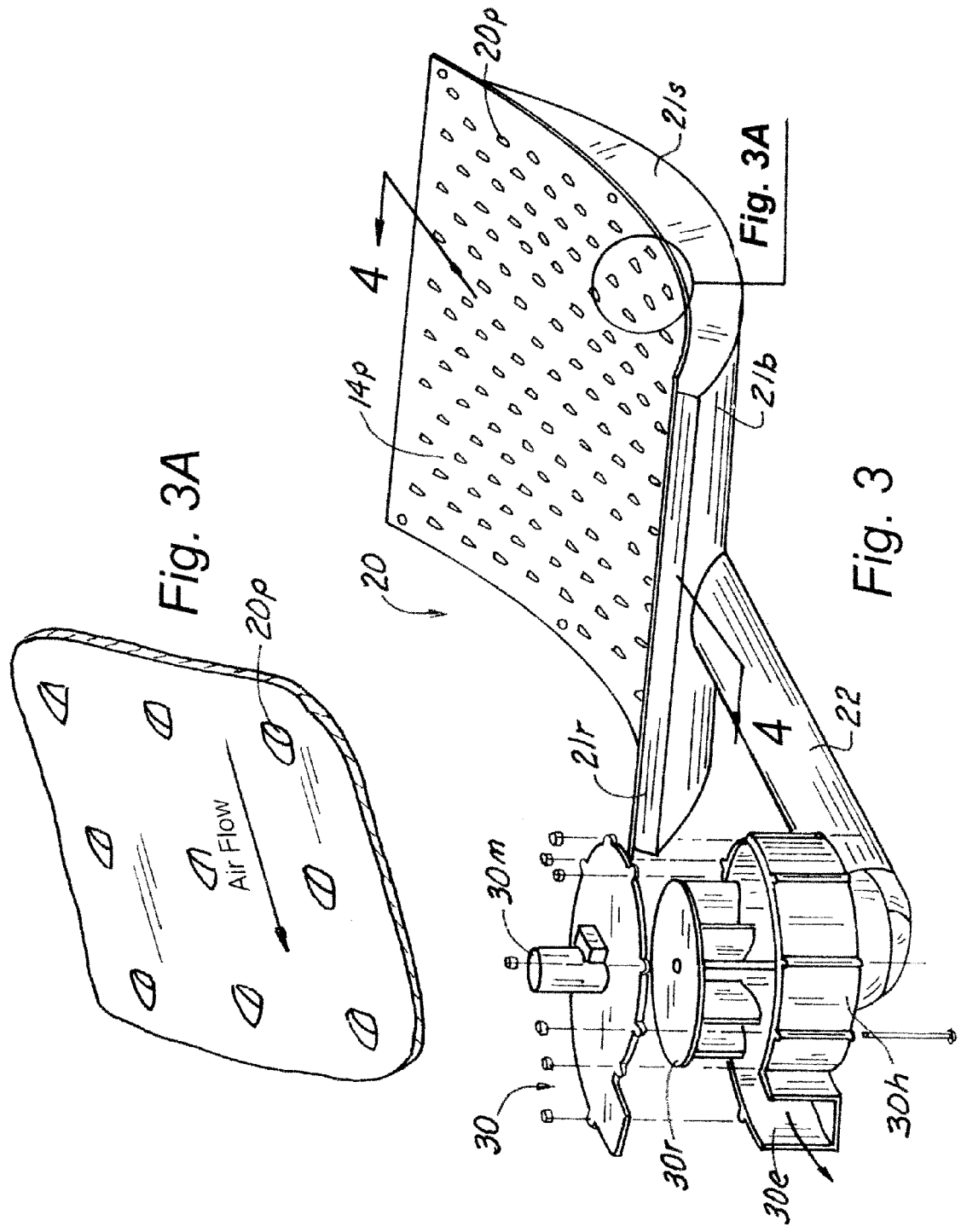

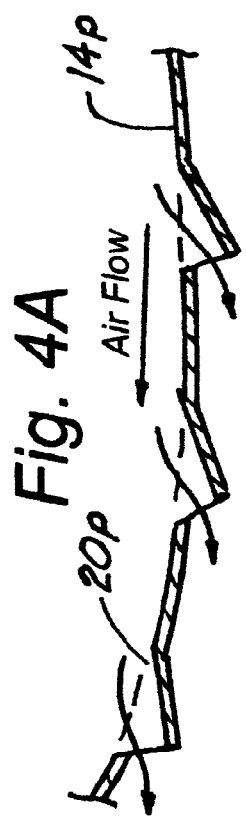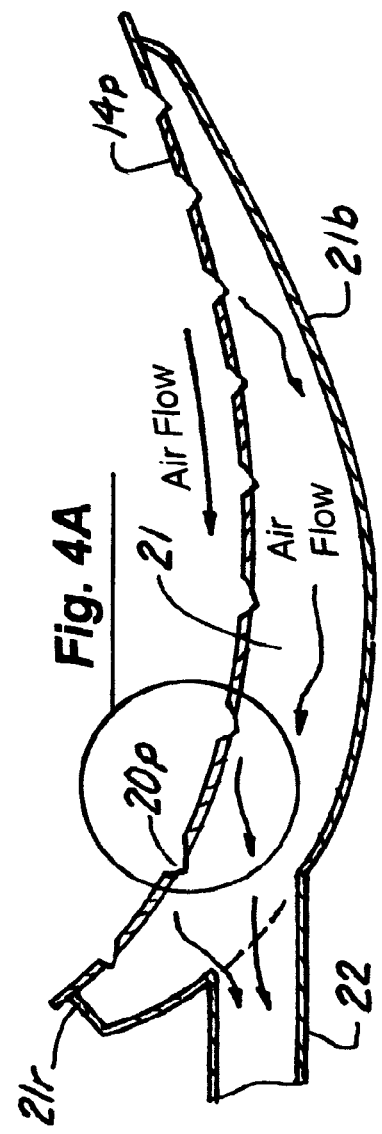

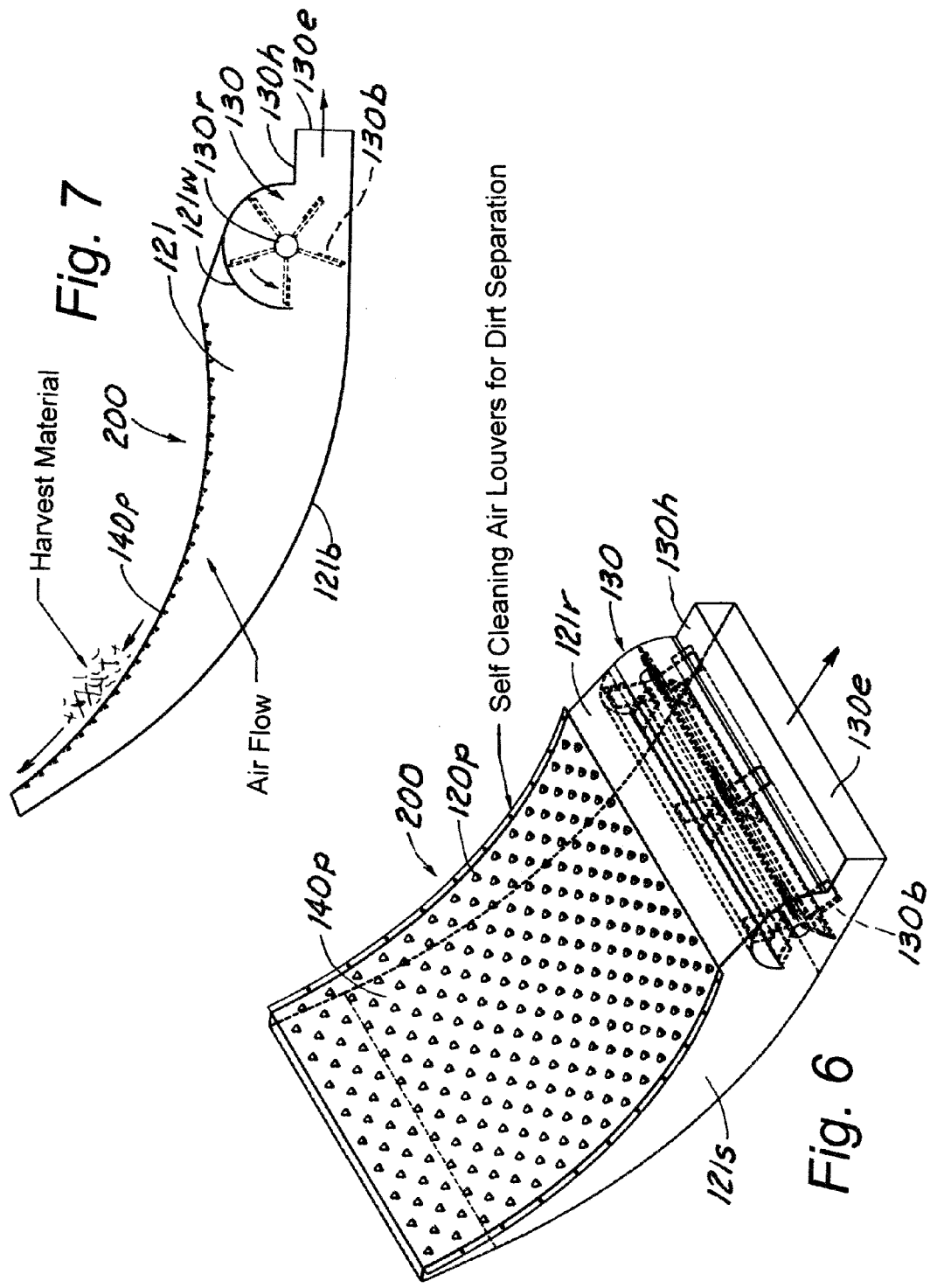

DUST REMOVAL ATTACHMENT FOR A BALER AND METHOD FOR USING SAME

TECHNICAL FIELD

This invention relates generally to cleaning material before it is baled, and more particularly for an attachment to a baler for removing dust and dirt from the material to be baled before such material is baled.

BACKGROUND

It is well known that hay or crop residue, such as corn stover or corn stalks that is to be fed to livestock is better for the livestock if it does not have contaminates such as dirt in it.

Biomass to be burned for energy or processed into ethanol is more valuable if it does not contain contaminants such as dirt.

Switch grass to be burned for energy or processed into ethanol is typically cut, windrowed on the ground and then picked up by a baler and baled. Similarly, corn stover, corn stalks and/or MOG ("material other than grain", including but not limited to corn stalks) of a combine is typically allowed to fall on the ground and is later picked up by a baler and baled. When the MOG is later picked up off of the ground by a baler, contaminants, such as dust and dirt, is picked up with the trash. This is inevitable if the MOG is picked up off of the ground. Such "dirty" MOG, switch grass, hay, etc. causes an increase in the cost of maintenance of balers that bale such dirty material due to wear on moving parts of the baler. Furthermore, a "dirty" bale is worth considerably less than a clean bale for producing energy or ethanol because the equipment (e.g. such as conveyors or grinders) that handles the material later in whatever it is to be used for will also be subject to more considerably more wear if the material has dirt in it.

POET, currently the largest ethanol producer in the world, for example, has stated that to ". . . take more biomass, the harvest equipment is set lower to the ground, picking up extra dirt, rocks, and other debris. This additional material would cause the biomass to be outside of POET's quality standards."

Accordingly, there is a need for an apparatus that will remove dirt from a crop being picked up off of the ground after the material is picked up but before the material is baled by a baler.

BRIEF DESCRIPTION OF THE DRAWINGS

The above needs are at least partially met through provision of the method and apparatus pertaining to an attachment for a baler to remove dust and dirt before baling described in the following detailed description, particularly when studied in conjunction with the drawings, wherein:

FIG. 1 is a perspective view of a front part of a baler being operated to pick up and bale a windrow of material such as hay;

FIG. 2 is a schematic view of portions of a baler with a rotating pickup with tines for picking up material to be baled and moving it towards a baling chamber of a baler;

FIG. 3 is a perspective and somewhat exploded view of the present invention separated from the baler;

FIG. 3A shows an enlarged detail of the flow at the circled place B in FIG. 3;

FIG. 4 is a cross sectional view taken along line 4-4 of FIG. 3;

FIG. 4A shows an enlarged detail of the flow at the circled place A in FIG. 4;

FIG. 6 is a perspective and somewhat exploded view of a second embodiment of the present invention separated from the baler; and FIG. 7 is a cross sectional view of the second embodiment of FIG. 6.

Figure 5:
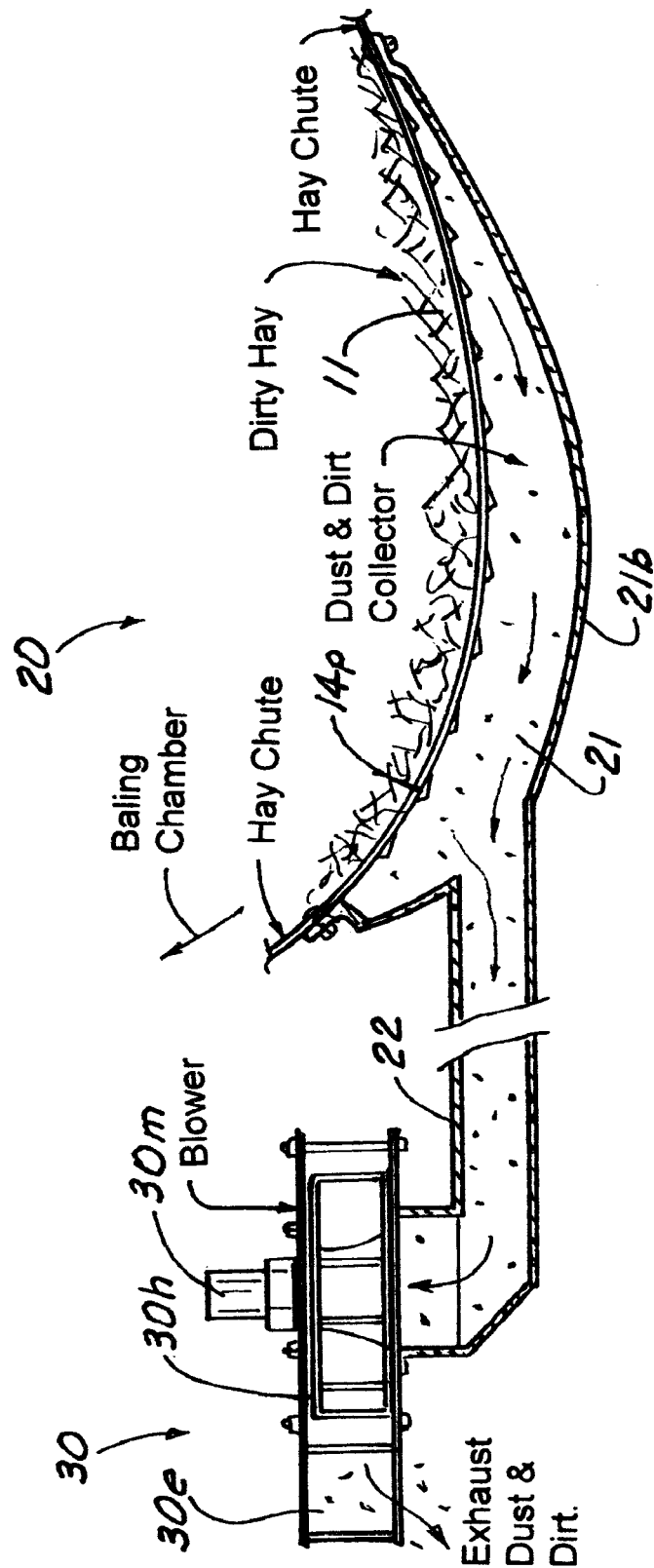
FIG. 5 is a view similar to FIG. 4, but showing also the blower and the attachment connected to the inlet of a baler in the process of cleaning hay in the inlet of the baling chamber.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Referring now to the drawings, wherein like reference numerals designate like or identical parts throughout the several views, FIG. 1 shows a baler 10, which can be self propelled or towed picking up a windrow 11 of hay from off of the ground. It will be understood however, that the present invention could be applied to a baler, which is stationary wherein the material to be baled is brought to such stationary baler.

Looking now at FIG. 2, the windrow of hay 11 in FIG. 1 is being picked up by a conventional rotary tine pickup 12 and moving the windrow of hay 11 from the ground to an inlet 14 between the baling chamber 13 and the pickup 12. The inlet section 14 comprises a top portion 14$t$, a bottom portion 14$b$ and a perforated section 14$p$. In FIG. 2, the baler is shown as a compression type "square" baler that actually makes bales that are rectilinear in shape, the "square" referring to the cross sectional shape of the bale. A ram 15 is shown schematically in place where it would periodically be pushed into the baling chamber 13 to compress any hay that is in the baling chamber 13. It is to be understood however that the baler 10 could be a baler of any type that makes bales of any shape, for example it could be a "round" baler that makes cylindrical shaped bales.

FIGS. 2 and 3 show the attachment of the present invention 20 that in FIG. 2 is shown attached to the baler 10 while FIG. 3 shows the attachment 20 separately, before it is attached to the baler 10. Upper perforated wall 14 replaces whatever was previously in the lower portion of the inlet section 14 of the baler shown in FIG. 1 and is connected with the fasteners shown on each end if the member 14$p$ in FIG. 5, for example.

An air chamber 21 is formed below with the perforated member 14$p$, the perforated member 14$p$ actually forming the upper wall of the chamber 21. Holes 20$p$ are disposed in the perforated member 14$p$, which of course is what makes the perforated member 14$p$ perforated. The chamber also has a lower or bottom wall 21$b$ and sidewalls 21$s$. A rear wall 21$r$ seals the back portion of the chamber 21.

A blower 30 is attached to the chamber 21 by a conduit 22. The blower 30 has a rotor 30r with blades 30b that are rotated by a motor 30m, which can be hydraulic or electric, for example. The rotor 30r is disposed in a housing 30h which has an exhaust port 30e.

Looking now to the embodiment 200 of FIGS. 6 and 7, upper perforated wall 140p replaces whatever was previously in the lower portion of the inlet section 14 of the baler shown in FIG. 2 and is connected with the fasteners like those shown on each end of the member 14p in FIG. 5, for example.

An air chamber 121 is formed below with the perforated member 140p, the perforated member 140p actually forming the upper wall of the chamber 121. Holes 120p are disposed in the perforated member 140p, which of course is what makes the perforated member 140p perforated, just like perforated member 14p of FIG. 4A. The chamber 121 also has a lower or bottom wall 121b and sidewalls 121s. A rear wall 121r seals the back portion of the chamber 121.

A blower 130 is disposed in the chamber 121 and has a partially cylindrical wall 121w. The blower 130 has a rotor 130r with blades 130b that are rotated by a motor, not shown, which can be hydraulic or electric, for example. The rotor 130r blows air through a housing 130h and out an exhaust port 130e.

In operation, the baler 10 would be moved forwardly to pick up a windrow of hay 11 off of the ground as shown in FIG. 1. As the hay 11 is picked up by the rotating pickup 12 shown in FIG. 2, it is pushed rearwardly into the inlet section 14 of the baler 10. At the same time that the hay 11 is moving from the pickup 12, through the inlet section 14 to the baling chamber 13, the blower 30/130 is being used to pull or push air from the inlet section 14/140, through the hay 11, through the perforations 20p/120p in perforated plate 14p/140p, through the chamber 21/121, through the conduit 22 or housing 130h and out through the exit port 30e/130e to atmosphere. Of course the dirt could be trapped by a filter or dumped into a container for disposal later if desired or required by government regulations.

Consequently the hay 11 delivered to the baling chamber 13 is cleaner than it would have otherwise been and therefore more valuable for feeding to livestock or for any other use that requires that it be processed by equipment that will wear out sooner when moving equipment parts have dirt on them than when such dirt has been removed.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

The invention claimed is:

1. An attachment for a baler to remove dust and dirt before baling comprising:
   a baler having a baling chamber, a pickup for picking up material to be baled from the ground and an inlet section between the pickup and the baling chamber;
   the inlet section having a perforated member at the bottom thereof;
   the perforated member forming a part of an air chamber; and
   a blower operatively attached to the air chamber for pulling or pushing air from the inlet section, through the perforated member and from the air chamber whereby dirt will be extracted from the inlet section before such dirt enters the baling chamber.

2. The apparatus of claim 1 wherein the perforated member is curved.

3. A method of using an attachment for a baler to remove dust and dirt before baling comprising a baler having a baling chamber, a pickup for picking up material to be baled from the ground and an inlet section between the pickup and the baling chamber; the inlet section having a perforated member at the bottom thereof; the perforated member forming a part of an air chamber and a blower operatively attached to the air chamber for pulling air from the inlet section, through the perforated member and from the air chamber whereby dirt will be extracted from the inlet section before such dirt enters the baling chamber, said method comprising:
   operating the pickup of the baler to deliver the material to be baled over the top of the perforated member of the inlet section;
   operating the blower to pull air from the inlet section, through the perforated member and from the air chamber to an exit port on the blower whereby dirt will be extracted from the inlet section before such dirt enters the baling chamber.

\* \* \* \* \*